United States Patent
Park et al.

(10) Patent No.: US 11,077,434 B2
(45) Date of Patent: Aug. 3, 2021

(54) METHOD OF PREPARING METALLOCENE CATALYST FOR POLYOLEFIN PREPARATION

(71) Applicant: LG Chem, Ltd., Seoul (KR)

(72) Inventors: Hee Kwang Park, Daejeon (KR); Hye Kyung Lee, Daejeon (KR); Byung Seok Kim, Daejeon (KR); Jae Youp Cheong, Daejeon (KR); Sang Jin Jeon, Daejeon (KR)

(73) Assignee: LG Chem, Ltd.

( * ) Notice: Subject to any disclaimer, the term of this patent is extended or adjusted under 35 U.S.C. 154(b) by 418 days.

(21) Appl. No.: 15/774,448

(22) PCT Filed: Jul. 7, 2017

(86) PCT No.: PCT/KR2017/007280
§ 371 (c)(1),
(2) Date: May 8, 2018

(87) PCT Pub. No.: WO2018/009016
PCT Pub. Date: Jan. 11, 2018

(65) Prior Publication Data
US 2019/0224661 A1    Jul. 25, 2019

(30) Foreign Application Priority Data

Jul. 7, 2016   (KR) .................. 10-2016-0086256
Jul. 6, 2017   (KR) .................. 10-2017-0085739

(51) Int. Cl.
*C08F 4/76*   (2006.01)
*B01J 31/22*  (2006.01)
(Continued)

(52) U.S. Cl.
CPC ......... *B01J 31/2295* (2013.01); *B01J 37/031* (2013.01); *C08F 4/658* (2013.01);
(Continued)

(58) Field of Classification Search
None
See application file for complete search history.

(56) References Cited

U.S. PATENT DOCUMENTS

| 5,646,322 A   | 7/1997 | van Beek et al. |
| 6,239,300 B1  | 5/2001 | Stouffer et al. |

(Continued)

FOREIGN PATENT DOCUMENTS

| CN | 101014606 A | 8/2007 |
| CN | 103987737 A | 8/2014 |

(Continued)

OTHER PUBLICATIONS

Chinese Search Report for Application No. 201780004055.1 dated Dec. 13, 2019, 2 pages.

(Continued)

*Primary Examiner* — Yun Qian
(74) *Attorney, Agent, or Firm* — Lerner, David, Littenberg, Krumholz & Mentlik, LLP

(57) ABSTRACT

A method of preparing a high-purity metallocene catalyst capable of providing various selectivities and high activities for polyolefin copolymers, wherein a metallocene compound is formed by reacting a ligand compound with a zirconium compound, and then lithium chloride as a reaction by-product included in the metallocene compound is prepared in a form of a complex compound and effectively removed in a subsequent step of extracting the catalyst, thereby effectively preparing the high-purity metallocene catalyst, is provided.

10 Claims, 1 Drawing Sheet

Example 1

Comparative Example 1

(51) Int. Cl.
*C08F 110/06* (2006.01)
*B01J 37/03* (2006.01)
*C08F 4/658* (2006.01)
*C08F 4/6592* (2006.01)
*C08F 4/659* (2006.01)
*C08F 10/06* (2006.01)

(52) U.S. Cl.
CPC ........ *C08F 4/65927* (2013.01); *C08F 110/06* (2013.01); *B01J 2231/12* (2013.01); *B01J 2531/48* (2013.01); *C08F 4/65908* (2013.01); *C08F 4/65912* (2013.01); *C08F 4/65916* (2013.01); *C08F 10/06* (2013.01)

(56) References Cited

U.S. PATENT DOCUMENTS

| | | |
|---|---|---|
| 6,248,883 B1 | 6/2001 | Gorkovenko et al. |
| 2006/0116490 A1 | 6/2006 | Paczkowski et al. |
| 2007/0032619 A1 | 2/2007 | Wang et al. |
| 2008/0027239 A1 | 1/2008 | Kolling |
| 2015/0031844 A1 | 1/2015 | Lee et al. |
| 2015/0073107 A1 | 3/2015 | Choi et al. |
| 2016/0009838 A1 | 1/2016 | Itagaki et al. |
| 2016/0257703 A1 | 9/2016 | Park et al. |

FOREIGN PATENT DOCUMENTS

| | | |
|---|---|---|
| CN | 104271586 A | 1/2015 |
| CN | 105026408 A | 11/2015 |
| CN | 105722870 A | 6/2016 |
| CN | 105985473 A | 10/2016 |
| JP | 3419456 B2 | 6/2003 |
| JP | 2010059375 A | 3/2010 |
| KR | 20080034188 A | 4/2008 |
| KR | 20130125311 A | 11/2013 |
| KR | 101429746 B1 | 9/2014 |
| KR | 20150145065 A | 12/2015 |
| KR | 20160045433 A | 4/2016 |
| KR | 101665076 B1 | 10/2016 |
| KR | 20170009596 A | 1/2017 |
| WO | WO 2013/168928 | * 5/2013 |

OTHER PUBLICATIONS

Extended European Search Report including Written Opinion for Application No. EP17824572.6 dated Dec. 20, 2018.

International Search Report for Application No. PCT/KR2017/007280 dated Dec. 13, 2017.

Yamashita et al., "Lithium Isotope Separation on Complex Formation I. Equilibrium Study", Mass Spectroscopy, Jun. 5, 1963.

* cited by examiner

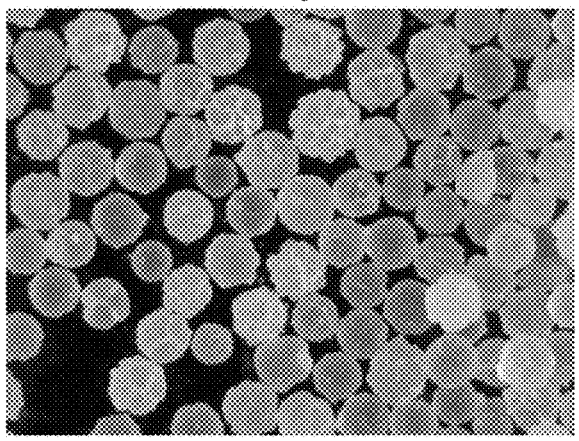
Example 1
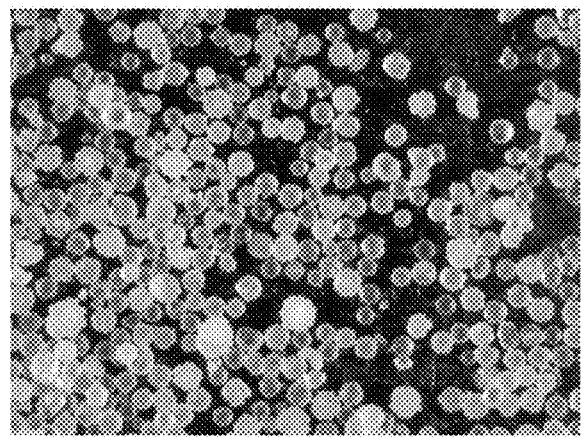
Comparative Example 1

METHOD OF PREPARING METALLOCENE CATALYST FOR POLYOLEFIN PREPARATION

CROSS-REFERENCE TO RELATED APPLICATIONS

The present application is a national phase entry under 35 U.S.C. § 371 of International Application No. PCT/KR2017/007280 filed Jul. 7, 2017, which claims priority from Korean Patent Application No. 10-2016-0086256 filed Jul. 7, 2016 and Korean Patent Application No. 10-2017-0085739 filed Jul. 6, 2017, all of which are incorporated herein by reference.

TECHNICAL FIELD

The present invention relates to a method of effectively preparing a high-purity metallocene catalyst which may exhibit high activity during preparation of high molecular weight polyolefins.

BACKGROUND OF THE INVENTION

Olefin polymerization catalyst systems may be categorized into a Ziegler-Natta catalyst system and a metallocene catalyst system. These two highly active catalyst systems have been developed according to their characteristics. The Ziegler-Natta catalyst system has been widely used in prior commercial processes since it was invented in the 1950s. However, the Ziegler-Natta catalyst system is characterized in that a molecular weight distribution of polymers obtained thereby is wide because it is a multi-site catalyst having a plurality of active sites, and the Ziegler-Natta catalyst system has a problem that a composition distribution of comonomers is not uniform and there is a limitation in securing desired physical properties.

The metallocene catalyst includes a combination of a main catalyst that is formed primarily of a transition metal compound and a cocatalyst that is an organometallic compound primarily formed of aluminum. Such a catalyst is a homogeneous complex catalyst and a single site catalyst. Due to single site characteristics thereof, a polymer of which a molecular weight distribution is narrow and a composition distribution of comonomers is uniform may be obtained, and stereoregularity, copolymerization characteristics, molecular weight, and degrees of crystallinity of the polymer may be changed by varying a ligand structure of the catalyst and adjusting polymerization conditions.

Meanwhile, an ansa-metallocene compound is an organometallic compound including two ligands which are linked to each other via a bridge group. The bridge group prevents rotation of the ligands and determines the structure and activity of the metal center.

Such an ansa-metallocene compound is being used as a catalyst for preparing olefinic homopolymers or copolymers. Particularly, it is known that an ansa-metallocene compound including a cyclopentadienyl-fluorenyl ligand may be used to prepare a high molecular weight polyethylene and to control a microstructure of a polypropylene. It is also known that an ansa-metallocene compound including an indenyl ligand has excellent activity and may be used to prepare a polyolefin with enhanced stereoregularity.

The present inventors disclosed an ansa-metallocene compound having a novel structure which may provide various selectivities and activities for polyolefin copolymers in Korean Patent Publication No. 10-2013-0125311.

Meanwhile, when the ansa-metallocene catalyst has a bis-indenyl ligand, two types of isomers, i.e., a racemate and a mirror-symmetric meso diastereomer, may be formed according to steric arrangement of two ligands. The racemate is preferred because it is used to prepare an isotactic polymer having high crystallinity and melting point as well as high specific gravity and mechanical strength, whereas the mirror-symmetric meso diastereomer is avoided because it prepares an atactic polymer. However, since the racemate and the mirror-symmetric meso diastereomer are simultaneously prepared in the preparation process of the ansa-metallocene catalyst, the structure of the ansa-metallocene catalyst in which an excess of the racemate may be formed must be importantly considered. Further, the ansa-metallocene catalysts capable of preparing a polyolefin with a higher high molecular weight are needed.

In the known metallocene catalyst, LiCl, which is one of by-products produced during synthesis of the metallocene catalyst, may coexist when it is not removed during a filtration process, and as a result, the LiCl decreases purity of the catalyst, causing a problem of reducing activity of the metallocene catalyst during polymerization of polymers.

Accordingly, it is necessary to develop a process of preparing an ansa-metallocene compound capable of preparing a high molecular weight polyolefin with high activity.

DETAILS OF THE INVENTION

Objects of the Invention

The present invention provides a high-purity metallocene catalyst capable of preparing a high molecular weight polyolefin with high activity.

Means for Achieving the Object

The present invention provides a method of preparing a metallocene catalyst, the method including the steps of: forming a metallocene compound by reacting a ligand compound represented by the following Chemical Formula 1 with a zirconium compound; forming a lithium chloride complex compound by adding a solvent for forming the lithium chloride complex compound to reaction products including the metallocene compound; and adding a solvent for extracting the lithium chloride complex compound to reaction products including the lithium chloride complex compound and the metallocene compound, followed by filtration.

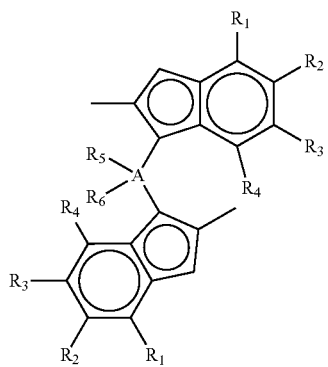

[Chemical Formula 1]

Herein, $R_1$ is a $C_{6-20}$ aryl substituted with a $C_{1-20}$ alkyl; $R_2$, $R_3$, and $R_4$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl; A is carbon, silicon, or germanium; $R_5$ is a $C_{1-20}$ alkyl substituted with a $C_{1-20}$ alkoxy; and $R_6$ is hydrogen, a $C_{1-20}$ alkyl, or a $C_{2-20}$ alkenyl.

Further, the present invention provides a metallocene catalyst prepared by the above-described method.

Hereinafter, a method of preparing a metallocene catalyst and a metallocene catalyst prepared thereby according to preferred embodiments of the present invention will be described in more detail.

In the present invention, the terms "first", "second", and the like are used to describe a variety of components, and these terms are merely employed to differentiate a certain component from other components.

Further, the terms used in this description are just for explaining exemplary embodiments, and are not intended to restrict the present invention. A singular expression may include a plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components, or combinations thereof beforehand.

The present invention may be variously modified and have various forms, and specific examples of the present invention will be explained in detail below. However, it is not intended to limit the present invention to the specific examples, and it must be understood that the present invention includes all modifications, equivalents, or replacements included in the spirit and technical scope of the present invention.

According to one embodiment of the present invention, a method of preparing a metallocene catalyst is provided, the method including the steps of: forming a metallocene compound by reacting a ligand compound represented by the following Chemical Formula 1 with a zirconium compound; forming a lithium chloride complex compound by adding a solvent for forming the lithium chloride complex compound to reaction products including the metallocene compound; and adding a solvent for extracting the lithium chloride complex compound to reaction products including the lithium chloride complex compound and the metallocene compound, followed by filtration.

In Chemical Formula 1, $R_1$ is a $C_{6-20}$ aryl substituted with a $C_{1-20}$ alkyl; $R_2$, $R_3$, and $R_4$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, $C_{1-20}$ silylether, a $C_{1-20}$ alkoxy, a $C_{6-20}$ aryl, a $C_{7-20}$ alkylaryl, or a $C_{7-20}$ arylalkyl; A is carbon, silicon, or germanium; $R_5$ is a $C_{1-20}$ alkyl substituted with a $C_{1-20}$ alkoxy; and $R_6$ is hydrogen, a $C_{1-20}$ alkyl, or a $C_{2-20}$ alkenyl.

In particular, the present invention is characterized by including the step of reacting with a solvent capable of forming a lithium chloride complex compound, e.g., a specific solvent having a ring structure including two or more oxygen atoms, so as to effectively remove LiCl which is produced as a by-product during reaction of a ligand compound and a transition metal compound, and the step of using a specific aprotic solvent capable of selectively extracting the organometallic compound and the lithium chloride complex compound. In other words, the present invention is characterized in that a solvent having a ring structure including two or more oxygen atoms, such as 1,4-dioxane, etc., which acts as a specific solvent for removing LiCl, is used as the solvent for forming the lithium chloride complex compound, and ultimately, a high-purity organometallic compound is prepared, thereby preparing a polypropylene with high activity.

In the present invention, the ligand compound includes an indene compound as shown in Chemical Formula 1.

In particular, the method of preparing the metallocene catalyst of the present invention may include the steps of preparing the ligand compound represented by the following Chemical Formula 1 by reacting an indene compound represented by the following Chemical Formula 2 with a compound represented by the following Chemical Formula 3; forming the metallocene compound by reacting the ligand compound represented by the following Chemical Formula 1 with a zirconium compound; forming the lithium chloride complex compound by adding the solvent for forming the lithium chloride complex compound to reaction products including the metallocene compound; and adding the solvent for extracting the lithium chloride complex compound to reaction products including the lithium chloride complex compound and the metallocene compound, followed by filtration.

[Chemical Formula 1]

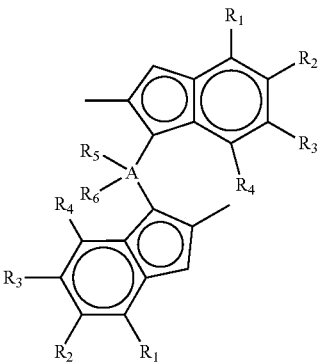

[Chemical Formula 1]

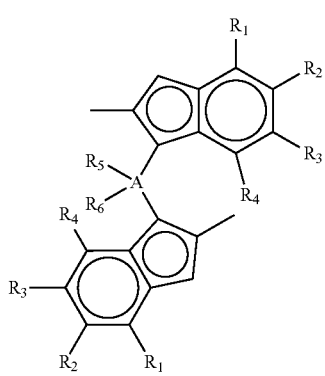

In Chemical Formula 1, $R_1$ is a $C_{6-20}$ aryl substituted with a $C_{1-20}$ alkyl; $R_2$, $R_3$, and $R_4$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl; A is carbon, silicon, or germanium; $R_5$ is a $C_{1-20}$ alkyl substituted with a $C_{1-20}$ alkoxy; and $R_6$ is hydrogen, a $C_{1-20}$ alkyl, or a $C_{2-20}$ alkenyl.

[Chemical Formula 2]

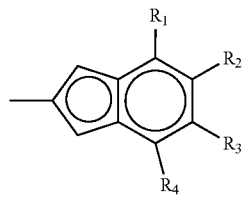

In Chemical Formula 2, $R_1$ is a $C_{6-20}$ aryl substituted with a $C_{1-20}$ alkyl; and $R_2$, $R_3$, and $R_4$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl.

[Chemical Formula 3]

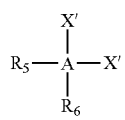

In Chemical Formula 3, A is carbon, silicon, or germanium; $R_5$ is a $C_{1-20}$ alkyl substituted with a $C_{1-20}$ alkoxy; and $R_6$ is hydrogen, a $C_{1-20}$ alkyl, or a $C_{2-20}$ alkenyl; X's are the same or different halogens.

$ZrX_4$                        [Chemical Formula 4]

In Chemical Formula 4, X's are the same or different halogens.

Further, the present invention provides a method of preparing a metallocene catalyst as a catalyst for olefin polymerization, which may minimize reaction by-products and may prepare the metallocene compound with high purity. The metallocene catalyst may particularly include a metallocene compound of the following Chemical Formula 5.

[Chemical Formula 5]

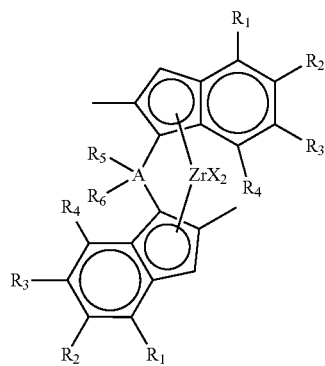

In Chemical Formula 5, X's are the same or different halogens; $R_1$ is a $C_{6-20}$ aryl substituted with a $C_{1-20}$ alkyl; $R_2$, $R_3$, and $R_4$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl; A is carbon, silicon, or germanium; $R_5$ is a $C_{1-20}$ alkyl substituted with a $C_{1-20}$ alkoxy; and $R_6$ is hydrogen, a $C_{1-20}$ alkyl, or a $C_{2-20}$ alkenyl.

The compound of Chemical Formula 5 has an ansa-metallocene structure and includes two indenyl groups as ligands. Particularly, the compound has an advantage that the bridge group connecting the ligands is substituted with a functional group which may take a role of a Lewis base as an oxygen-donor, and therefore, activity of the catalyst may be maximized. Further, since the indenyl groups are substituted by a bulky group such as a $C_{6-20}$ aryl ($R_1$) substituted with a $C_{1-20}$ alkyl, steric hindrance occurs and formation of a meso-form is prevented. Therefore, the indene compound represented by Chemical Formula 1 may be used to more easily prepare a polyolefin having desired physical properties, when it is used as a catalyst for preparing the polyolefin by itself or in a supported form. Further, since the catalyst includes zirconium (Zr) as a metal atom, activity of the catalyst may be improved and a polyolefin having a higher molecular weight may be polymerized.

Preferably, $R_1$ is phenyl substituted with tert-butyl. More preferably, $R_1$ is 4-tert-butyl-phenyl.

More preferably, $R_2$, $R_3$, and $R_4$ are hydrogen.

More preferably, A is silicon.

More preferably, $R_5$ is 3-(t-butoxy)-propyl and $R_6$ is methyl.

Representative examples of the compound represented by Chemical Formula 5 are as follows.

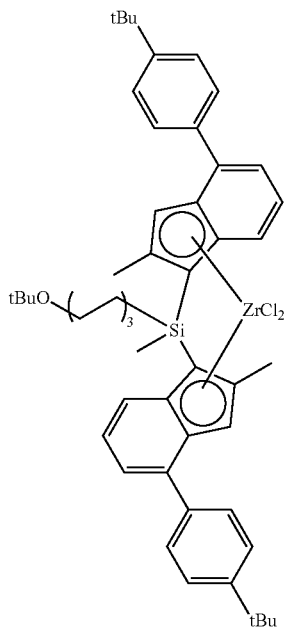

In particular, the method of preparing the metallocene catalyst according to the present invention may be performed by the following Reaction Scheme 1.

[Reacton Scheme 1]

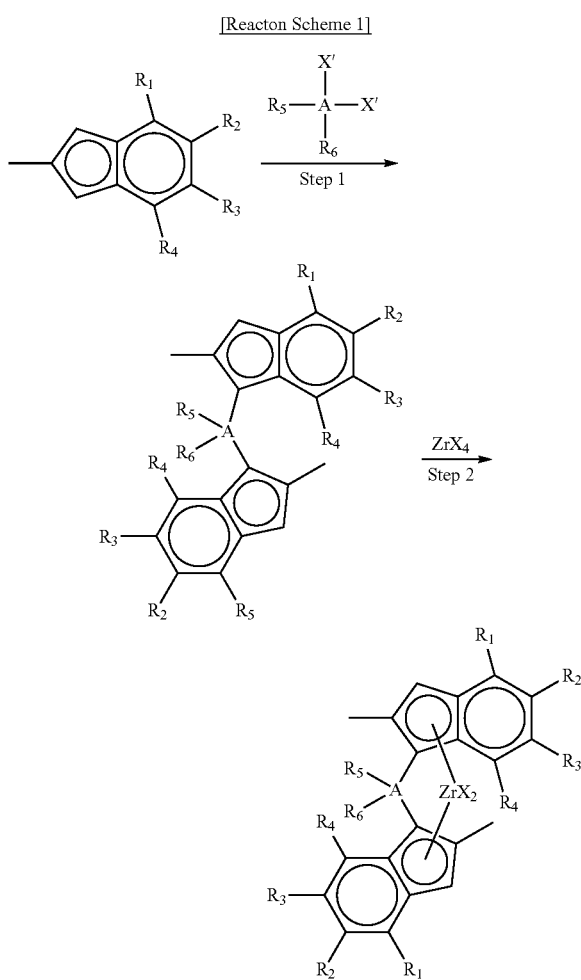

The step 1 is the step of preparing the ligand compound represented by Chemical Formula 1 by reacting the indene compound represented by Chemical Formula 2 with the compound represented by Chemical Formula 3. Alkyllithium (e.g., n-butyllithium) is preferably used in the reaction, and the reaction temperature is −200° C. to 0° C., and more preferably −150° C. to 0° C. Toluene, tetrahydrofuran (THF), etc. may be used as a solvent. In this regard, the steps of separating an organic layer from the product, vacuum drying the separated organic layer, and eliminating an excess of the reactant therefrom may be further carried out.

The step 2 is the step of preparing the compound represented by Chemical Formula 5 by reacting the ligand compound represented by Chemical Formula 3 with the zirconium compound represented by Chemical Formula 4. Alkyllithium (e.g., n-butyllithium) is preferably used in the reaction, and the reaction temperature is −20° C. to 0° C., and more preferably −78° C. to 0° C. One or more selected from the group consisting of diethyl ether, hexane, toluene, and 1,4-dioxane may be used as a solvent of the reaction.

Particularly, according to the present invention, the step of removing the reaction solvent after the above reaction and then forming the lithium chloride complex compound by adding the solvent for forming the lithium chloride complex compound to the reaction products including the obtained metallocene compound may be performed. Here, the solvent for forming the lithium chloride complex compound has a characteristic of dissolving both of the produced lithium chloride complex compound and the metallocene compound while forming the complex compound by reacting with lithium chloride. In general, a Li atom which is a component of LiCl is oxophilic, and thus LiCl may easily form a complex with an oxygen atom included in the solvent. However, for more effective formation of the complex compound with LiCl which coexists as an impurity in the reaction products including the metallocene compound, an organic solvent containing two or more oxygen atoms and having a ring structure is preferred. Specifically, when an organic solvent containing two or more oxygen atoms is used, reactivity with LiCl is increased due to high oxophilicity, and when the organic solvent has a ring structure, a shielding effect by surrounding carbon atoms is reduced, and therefore the oxygen atoms effectively form the complex compound, together with LiCl, with high oxophilicity. The solvent for forming the lithium chloride complex compound may be one or more selected from the group consisting of 1,4-dioxane and 1,3-dioxolane.

The solvent for forming the lithium chloride complex compound may be added in an amount of about 3 times to about 20 times, preferably about 5 times to about 15 times, and most preferably about 8 times to about 12 times the weight of the indene compound of Chemical Formula 2, and then stirred for about 1 h or more.

The lithium chloride complex compound thus prepared is a lithium chloride-1,4-dioxane complex compound in which a ratio of LiCl/dioxane is 1:1.

The solvent for forming the lithium chloride complex compound may be removed by vacuum distillation under conditions of a pressure of 0.5 mbar to 2.0 mbar and a temperature of 30° C. to 45° C.

Further, after the solvent for forming the lithium chloride complex compound is added and then stirred, the reaction products obtained after removing the solvent for forming the lithium chloride complex compound such as 1,4-dioxane, etc. may include the lithium chloride complex compound and the metallocene compound. The step of adding a solvent for extracting the lithium chloride complex compound to the reaction products including the lithium chloride complex compound and the metallocene compound, followed by filtration, may be performed. Here, the solvent for extracting the lithium chloride complex compound may dissolve only the lithium chloride complex compound in the reaction products to obtain only the metallocene compound in a solid state by filtration. The solvent for extracting the lithium chloride complex compound may be an aprotic solvent including no oxygen atoms. Specifically, when an organic solvent including oxygen atoms is added to the reaction products including the lithium chloride complex compound and the metallocene compound, the metallocene compound which is the product may also be dissolved. When a protic solvent such as an alcohol, which is one of polar solvents, is used, the metallocene compound which is the product may be decomposed. The solvent for extracting the lithium chloride complex compound may be, for example, one or more selected from the group consisting of dichloromethane, chloroform, carbon tetrachloride, benzene, and toluene.

The solvent for extracting the lithium chloride complex compound may be added in an amount of about 3 times to about 20 times, preferably about 4 times to about 15 times, and most preferably about 5 times to about 12 times the weight of the indene compound of Chemical Formula 2, and then stirred for about 1 h or more.

In the method of preparing the metallocene catalyst according to the present invention, the extraction solvent may be added and filtration may be performed, and then the solvent may be removed from the obtained filtrate, preferably followed by vacuum distillation and recrystallization. In the recrystallization, one or more solvents selected from the group consisting of dichloromethane and hexane may be used.

Meanwhile, according to another embodiment of the present invention, a metallocene catalyst prepared by the above-described method is provided. In particular, the metallocene catalyst prepared according to the present invention may have high purity by removing as much as possible of the LiCl reaction impurity. Specifically, a content of LiCl in the prepared metallocene catalyst may be 200 ppm or less, 150 ppm or less, 100 ppm or less, or 75 ppm or less.

In the metallocene catalyst of the present invention, the compound represented by Chemical Formula 5 may be used as the catalyst for olefin polymerization by itself or in combination with a cocatalyst as a catalyst precursor.

The metallocene catalyst may be a catalyst supported on a carrier. The carrier is not particularly limited as long as it is commonly used in the art to which the present invention pertains. Preferably, one or more carriers selected from the group consisting of silica, silica-alumina, and silica-magnesia may be used. Meanwhile, when the catalyst is supported on a carrier such as silica, the silica carrier and the functional group of the compound represented by Chemical Formula 1 are chemically bonded. Therefore, the catalyst is hardly released from the surface during the olefin polymerization, and there is no fouling that is the adhesion of polymers onto a reactor wall or between polymer particles when polyolefin is prepared by slurry or vapor phase polymerization.

Further, since polyolefin prepared in the presence of the catalyst including such silica carrier is superior in particle shape and apparent density of the polymer, the polyolefin may be suitable for traditional slurry or vapor-phase polymerization. Therefore, a carrier that is dried at high temperature and has highly reactive siloxane groups on the surface may be preferably used.

Specifically, silica, silica-alumina, etc. dried at a high temperature may be used, and they may include an oxide, carbonate, sulfate, or nitrate component, such as $Na_2O$, $K_2CO_3$, $BaSO_4$, $Mg(NO_3)_2$, etc.

Furthermore, the metallocene catalyst may include a cocatalyst consisting of alkylaluminoxane. When the cocatalyst is used, the catalyst may be used in the form where X group bonded to the metal element (Hf) of the compound represented by Chemical Formula 5 is substituted with an alkyl group, e.g., a $C_{1-20}$ alkyl.

The cocatalyst is not particularly limited as long as it is commonly used in the related art to which the present invention pertains. Preferably, one or more cocatalysts selected from the group consisting of silica, silica-alumina, and an organoaluminum compound may be used.

Meanwhile, according to still another embodiment, a method of polymerizing a polymer by using the metallocene catalyst is provided. Particularly, a method of preparing a polyolefin is provided, the method including the step of polymerizing at least one olefinic monomer in the presence of the metallocene catalyst. The olefinic monomer may be one or more selected from the group consisting of ethylene, propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, and mixtures thereof.

Here, the polymerization of polyolefin may be carried out at a temperature of 25° C. to 500° C. and a pressure of 1 kgf/cm² to 100 kgf/cm² for 1 h to 24 h. In this regard, the polymerization temperature is preferably 25° C. to 200° C., and more preferably 50° C. to 500° C. Further, the polymerization reaction pressure is preferably 1 kgf/cm² to 70 kgf/cm², and more preferably 5 kgf/cm² to 40 kgf/cm². The polymerization reaction time is preferably 1 h to 5 h.

The polymerization process may control the molecular weight range of a final polymer product according to whether hydrogen is added thereto or not. Particularly, a polyolefin having a high molecular weight may be prepared when hydrogen is not added, and a polyolefin having a low molecular weight may be prepared even by using a small quantity of hydrogen when hydrogen is added. In this regard, the amount of hydrogen added to the polymerization process may be 0.07 L to 4 L under a reactor condition of 1 atm, or hydrogen may be provided to the reactor with a pressure of 1 bar to 40 bar, or at a mole ratio of hydrogen to an olefinic monomer of 168 ppm to 8000 ppm.

In the process of preparing a polyolefin by using the metallocene catalyst prepared according to the present invention, activity of the catalyst may be 8.0 kg/gCat·h or more, or 8.0 to 30 kg/mmol·h, preferably 10.0 kg/mmol·h or more, and more preferably 12.0 kg/mmol·h or more, when calculated as a ratio of the weight (kg) of the produced polymer to the unit weight (g) of the used catalyst, based on unit time (h).

The polyolefin prepared by using the compound of Chemical Formula 5 as a catalyst may have a high molecular weight, as compared with those prepared by using known metallocene catalysts. For example, a melt index (MFR, 2.16 kg) of the polyolefin, which is measured according to the American Society for Testing and Materials ASTM D1238, may be greatly reduced to 25 g/10 min or less, preferably 18 g/10 min or less, and most preferably 15 g/10 min or less, and therefore a polyolefin having a high molecular weight may be obtained.

Particularly, the present invention is characterized in that vacuum distillation is further performed after dissolving the catalyst in the solvent for forming the lithium chloride complex compound such as 1,4-dioxane, etc. during the known preparation process of the catalyst, thereby preparing the catalyst with higher purity. Furthermore, the present invention may be very effective for removing by-products such as LiCl, etc., and may achieve the effect of increasing filtration efficiency due to an increase of the particle size. For example, a polyolefin prepared by using the metallocene catalyst according to the present invention may have an average particle size of 500 μm or more, or 500 μm to 1200 μm, preferably 600 μm or more, and more preferably 700 μm or more.

When a polyolefin is used in films, residual inorganic materials increase gelling in the film. Since a high-purity polymer may be prepared by using the metallocene catalyst prepared according to the present invention, gelling is reduced when the polymer is used in films, and accordingly, processibility may be remarkably improved.

Effects of the Invention

A high-purity metallocene catalyst according to the present invention is prepared by effectively removing LiCl which is a by-product generated during synthesis of the catalyst exhibits superior catalytic activity in olefin polymerization, as compared to known metallocene compounds. When this metallocene catalyst is used in polyolefin preparation, a polyolefin having a high molecular weight may be easily prepared.

BRIEF DESCRIPTION OF DRAWINGS

The FIGURE is an image showing a size and a distribution of particles produced after performing polymerization processes according to Example 1 and Comparative Example 1 of the present invention.

DETAILED DESCRIPTION OF THE EMBODIMENTS

Hereinafter, preferred examples will be provided for better understanding of the present invention. However, the following examples are only provided for understanding the present invention more easily, and the content of the present invention is not limited thereby.

EXAMPLES

Example 1

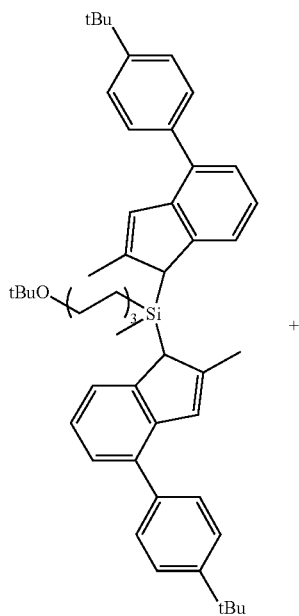

+

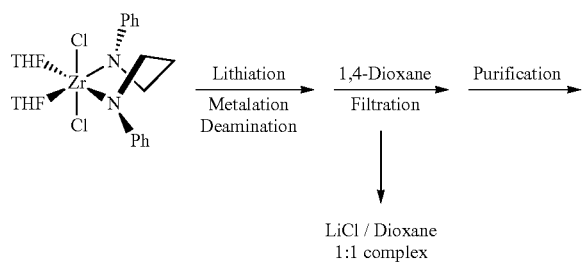

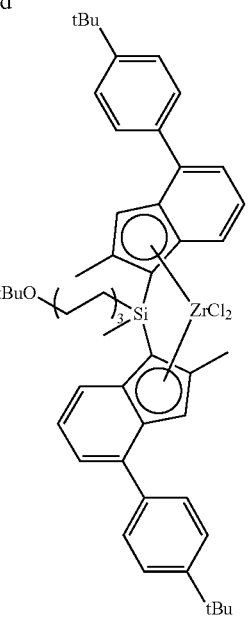

Step 1) Preparation of (3-t-butoxypropyl)(methyl)-bis(2-methyl-4-(4-t-butylphenyl)indenyl)silane 150 g of 2-methyl-4-(4-t-butylphenyl)-indene was put in a 3 L Schlenk flask, and a toluene/THF (5:1, 715 mL) solution was added thereto and dissolved at room temperature. The solution was cooled to −20° C., and then 240 mL of n-butyllithium solution (n-BuLi, 2.5 M in hexane) was slowly added dropwise and stirred at room temperature for about 15 h. Thereafter, the reaction solution was cooled to −20° C., and 82 g of (3-t-butoxypropyl)dichloromethylsilane and 512 mg of CuCN were slowly added dropwise. The reaction solution was raised to room temperature and stirred for about 15 h, and then 500 mL of water was added thereto. Thereafter, an organic layer was separated and dried over $MgSO_4$, followed by filtration. A filtrate was distilled under reduced pressure to obtain a yellow oil.

$^1$H NMR (500 MHz, $CDCl_3$, 7.26 ppm): −0.09-−0.05; (3H, m), 0.40-0.60; (2H, m), 0.80-1.51; (26H, m), 2.12-2.36; (6H, m), 3.20~3.28; (2H, m), 3.67-3.76; (2H, m), 6.81-6.83; (2H, m), 7.10-7.51; (14H, m)

Step 2) Preparation of rac-[(3-t-butoxypropylmethylsilanediyl)-bis(2-methyl-4-(4-t-butylphenyl)indenyl)]zirconium dichloride Previously prepared (3-t-butoxypropyl)(methyl)bis(2-methyl-4-(4-t-butylphenyl)indenylsilane was put in a 3 L Schlenk flask, and 1 L of toluene/diethylether (volume ratio of 10:1) was added thereto and dissolved at room temperature. The solution was cooled to −20° C., and then 240 mL of an n-butyllithium solution (n-BuLi, 2.5 M in hexane) was slowly added dropwise and stirred at room temperature for about 3 h. Thereafter, the reaction solution was cooled to −20° C., and 92 g of zirconium chloride was added thereto. The reaction solution was raised to room temperature and stirred for about 15 h, and the solvent was removed under reduced pressure. After distillation of all the reaction solvents under reduced pressure, 1,4-dioxane was added in an amount of 750 g, which is about 5 times the weight of 2-methyl-4-(4-t-butylphenyl)-indene, and stirred for about 1 h. The solvent was removed under reduced pressure to obtain a solid mixture of a lithium chloride-1,4-dioxane complex compound and an organometallic compound.

About 1 L of dichloromethane was added to a reaction vessel containing the thus-obtained solid mixture, and insoluble inorganic salts, etc. were removed by filtration. A filtrate was dried under reduced pressure, and 300 mL of dichloromethane was added thereto to precipitate crystals. The precipitated crystals were filtered and dried to obtain 80 g of rac-[(3-t-butoxypropylmethylsilanediyl)-bis(2-methyl-4-(4-t-butylphenyl)indenyl)]zirconium dichloride (yield 31.7%, rac:meso=50:1).

$^1$H NMR (500 MHz, CDCl$_3$, 7.26 ppm): 1.19-1.78; (37H, m), 2.33; (3H, s), 2.34; (3H, s), 3.37; (2H, t), 6.91; (2H, s), 7.05-7.71; (14H, m)

The thus-obtained metallocene catalyst was subjected to inductively coupled plasma (ICP-AES) analysis to measure the content of a LiCl reaction impurity. As a result, the content of LiCl was 75 ppm, indicating that the metallocene catalyst having very high purity was prepared by removing the impurity.

Step 3) Preparation of supported catalyst 3 g of silica was weighed and put in a Schlenk flask, and then 10 mmol of methylaluminoxane (MAO) was added thereto, and allowed to react at 90° C. for about 24 h. After precipitation, an upper layer was removed and a remaining part was washed once with toluene. 60 μmol of rac-[(3-t-butoxypropylmethylsilanediyl)-bis(2-methyl-4-(4-t-butylphenyl)indenyl)]zirconium dichloride, which is an ansa-metallocene compound prepared in step 2, was dissolved in toluene, and allowed to react at about 70° C. for about 5 h. After the reaction was terminated and precipitation was completed, an upper solution was removed and a remaining reaction product was washed with toluene. The next day, 48 μmol of borate (AB) was dissolved in toluene, and allowed to react at about 70° C. for about 5 h. After the reaction was terminated and precipitation was completed, an upper solution was removed and a remaining reaction product was washed with toluene, and further washed with hexane and then dried under vacuum to obtain 5 g of a silica-supported metallocene catalyst in a solid particle form.

Example 2

78 g of a metallocene catalyst rac-[(3-t-butoxypropylmethylsilanediyl)-bis(2-methyl-4-(4-t-butylphenyl)indenyl)]zirconium dichloride (yield 30.9%, rac:meso=50:1) was prepared in the same manner as in Example 1, except that after reaction by addition of zirconium chloride, the reaction solvents were all removed by distillation under reduced pressure and 1,4-dioxane was added in an amount of 1500 g, which is about 10 times the weight of 2-methyl-4-(4-t-butylphenyl)-indene, and then the content of LiCl was measured.

In this regard, the content of LiCl in the produced metallocene catalyst was 30 ppm, indicating that the metallocene catalyst having very high purity was prepared by removing the impurity.

Example 3

80 g of a metallocene catalyst rac-[(3-t-butoxypropylmethylsilanediyl)-bis(2-methyl-4-(4-t-butylphenyl)indenyl)]zirconium dichloride (yield 31.7%, rac:meso=50:1) was prepared in the same manner as in Example 1, except that after reaction by addition of zirconium chloride, the reaction solvents were all removed by distillation under reduced pressure and 1,4-dioxane was added in an amount of 2250 g, which is about 15 times the weight of 2-methyl-4-(4-t-butylphenyl)-indene, and then the content of LiCl was measured.

In this regard, the content of LiCl in the produced metallocene catalyst was 50 ppm, indicating that the metallocene catalyst having very high purity was prepared by removing the impurity.

Comparative Example 1

Step 1) Preparation of (3-t-butoxypropyl)(methyl)-bis(2-methyl-4-(4-t-butylphenyl)indenyl)silane 150 g of 2-methyl-4-(4-t-butylphenyl)-indene was put in a 3 L Schlenk flask, and a toluene/THF (5:1, 715 mL) solution was added thereto and dissolved at room temperature. The solution was cooled to −20° C., and then 240 mL of n-butyllithium solution (n-BuLi, 2.5 M in hexane) was slowly added dropwise and stirred at room temperature for about 3 h. Thereafter, the reaction solution was cooled to −20° C., and 82 g of (3-t-butoxypropyl)dichloromethylsilane and 512 mg of CuCN were slowly added dropwise. The reaction solution was raised to room temperature and stirred for about 15 h, and then 500 mL of water was added thereto. Thereafter, an organic layer was separated and dried over MgSO$_4$, followed by filtration. A filtrate was distilled under reduced pressure to obtain a yellow oil.

$^1$H NMR (500 MHz, CDCl$_3$, 7.26 ppm): −0.09-−0.05; (3H, m), 0.40-0.60; (2H, m), 0.80-1.51; (26H, m), 2.12-2.36; (6H, m), 3.20~3.28; (2H, m), 3.67-3.76; (2H, m), 6.81-6.83; (2H, m), 7.10-7.51; (14H, m)

Step 2) Preparation of rac-[(3-t-butoxypropylmethylsilanediyl)-bis(2-methyl-4-(4-t-butylphenyl)indenyl)]zirconium dichloride Previously prepared (3-t-butoxypropyl)(methyl)bis(2-methyl-4-(4-t-butylphenyl)indenylsilane was put in a 3 L Schlenk flask, and 1 L of toluene/diethylether (10:1) was added thereto and dissolved at room temperature. The solution was cooled to −20° C., and then 240 mL of n-butyllithium solution (n-BuLi, 2.5 M in hexane) was slowly added dropwise and stirred at room temperature for about 3 h. Thereafter, the reaction solution was cooled to −20° C., and 92 g of zirconium chloride was added thereto. The reaction solution was raised to room temperature and stirred for about 15 h, and the reaction solvent was removed under reduced pressure. Without treatment of a solvent for forming a lithium chloride complex compound, about 1 L of dichloromethane was added, and insoluble inorganic salts, etc. were removed by filtration. A filtrate was dried under reduced pressure, and 300 mL of dichloromethane was added to precipitate crystals. The precipitated crystals were filtered and dried to obtain 80 g of rac-[(3-t-butoxypropylmethylsilanediyl)-bis(2-methyl-4-(4-t-butylphenyl)indenyl)]zirconium dichloride (yield 31.7%, rac:meso=50:1).

$^1$H NMR (500 MHz, CDCl$_3$, 7.26 ppm): 1.19-1.78; (37H, m), 2.33; (3H, s), 2.34; (3H, s), 3.37; (2H, t), 6.91; (2H, s), 7.05-7.71; (14H, m)

The thus-obtained metallocene catalyst was subjected to inductively coupled plasma (ICP-AES) analysis to measure the content of a LiCl reaction impurity. As a result, the content of LiCl was 2110 ppm, indicating that the metallocene catalyst had a high content of impurity.

Step 3) Preparation of supported catalyst 3 g of silica was weighed and put in a Schlenk flask and then 10 mmol of methylaluminoxane (MAO) was added thereto, and allowed to react at 90° C. for about 24 h. After precipitation, an upper layer was removed and a remaining part was washed once with toluene. 60 μmol of rac-[(3-t- butoxypropylmethylsilanediyl)-bis(2-methyl-4-(4-t-butylphenyl)indenyl)]zirconium dichloride, which is an ansa-metallocene compound prepared in step 2, was dissolved in toluene, and allowed to react at about 70° C. for about 5 h. After the reaction was terminated and precipitation was completed, an upper solution was removed and a remaining reaction product was washed with toluene. The next day, 48 μmol of borate (AB) was dissolved in toluene, and allowed to react at about 70° C. for about 5 h. After the reaction was terminated and precipitation was completed, an upper solution was removed and a remaining reaction product was washed with toluene, and further washed with hexane and then dried under vacuum, to obtain 5 g of a silica-supported metallocene catalyst in a solid particle form.

Comparative Example 2

A metallocene catalyst was prepared in the same manner as in Example 1, except that after reaction by addition of zirconium chloride, the reaction solvents were all removed by distillation under reduced pressure and tetrahydrofuran (THF) was added, instead of 1,4-dioxane, in an amount of 1500 g, which is about 10 times the weight of 2-methyl-4-(4-t-butylphenyl)-indene, and then the content of LiCl was measured.

In this regard, the content of LiCl in the produced metallocene catalyst was 450 ppm, indicating that the metallocene catalyst had a high content of impurity.

Comparative Example 3

A metallocene catalyst was prepared in the same manner as in Example 1, except that after reaction by addition of zirconium chloride, the reaction solvents were all removed by distillation under reduced pressure and methyl tertiary butyl ether was added, instead of 1,4-dioxane, in an amount of 1500 g, which is about 10 times the weight of 2-methyl-4-(4-t-butylphenyl)-indene, and then the content of LiCl was measured.

In this regard, the content of LiCl in the produced metallocene catalyst was 1730 ppm, indicating that the metallocene catalyst had a high content of impurity.

Comparative Example 4

A metallocene catalyst was prepared in the same manner as in Example 1, except that after reaction by addition of zirconium chloride, the reaction solvents were all removed by distillation under reduced pressure and diethylether (Et$_2$O) was added, instead of 1,4-dioxane, in an amount of 1500 g, which is about 10 times the weight of 2-methyl-4-(4-t-butylphenyl)-indene, and then the content of LiCl was measured.

In this regard, the content of LiCl in the produced metallocene catalyst was 1850 ppm, indicating that the metallocene catalyst had a high content of impurity.

Comparative Example 5

After reaction by addition of zirconium chloride, the reaction solvents were all removed by distillation under reduced pressure and 1,4-dioxane was added in an amount of about 750 g, which is about 5 times the weight of 2-methyl-4-(4-t-butylphenyl)-indene, and then insoluble solids were filtered and dried to obtain 8 g of rac-[(3-t-butoxypropylmethylsilanediyl)-bis(2-methyl-4-(4-t-butylphenyl)indenyl)]zirconium dichloride (yield 3.2%).

The thus-obtained metallocene catalyst was subjected to inductively coupled plasma (ICP-AES) analysis to measure the content of a LiCl reaction impurity. As a result, the content of LiCl was 1080 ppm, indicating that the metallocene catalyst had a high content of impurity, and its industrial application was difficult due to a low yield of 3.2%.

Comparative Example 6

5 g of a metallocene catalyst rac-[(3-t-butoxypropylmethylsilanediyl)-bis(2-methyl-4-(4-t-butylphenyl)indenyl)]zirconium dichloride (yield 2.0%) was prepared in the same manner as in Comparative Example 5, except that after reaction by addition of zirconium chloride, the reaction solvents were all removed by distillation under reduced pressure and 1,4-dioxane was added in an amount of about 1500 g, which is about 10 times the weight of 2-methyl-4-(4-t-butylphenyl)-indene, and then the content of LiCl was measured.

In this regard, the content of LiCl in the produced metallocene catalyst was 1415 ppm, indicating that the metallocene catalyst had a high content of impurity, and its industrial application was difficult due to a low yield of 3.2%.

Comparative Example 7

Preparation of a metallocene catalyst was attempted in the same manner as in Comparative Example 1, except that after reaction by addition of zirconium chloride, the reaction solvents were all removed by distillation under reduced pressure and 1,4-dioxane was added in an amount of about 2250 g, which is about 15 times the weight of 2-methyl-4-(4-t-butylphenyl)-indene. However, all products were dissolved, and thus no organometallic compound was obtained (yield 0%). Also, the content of LiCl could not be measured.

The main process conditions after reaction by addition of zirconium chloride in the preparation processes of the catalysts according to Examples 1 to 3 and Comparative Examples 1 to 7, and the contents of LiCl measured in the produced catalysts, are shown in Table 1 below.

TABLE 1

| | Step of forming LiCl complex compound | | Step of selectively extracting organometallic compound | | Content of LiCl in catalyst (ppm) |
|---|---|---|---|---|---|
| | Solvent | Amount (ratio) | Solvent | Amount (ratio) | |
| Example 1 | 1,4-Dioxane | 5 | Dichloromethane | 5 | 75 |
| Example 2 | 1,4-Dioxane | 10 | Dichloromethane | 5 | 30 |
| Example 3 | 1,4-Dioxane | 15 | Dichloromethane | 5 | 50 |
| Comparative Example 1 | — | — | Dichloromethane | 5 | 2950 |

TABLE 1-continued

|  | Step of forming LiCl complex compound | | Step of selectively extracting organometallic compound | | Content of LiCl in catalyst (ppm) |
|---|---|---|---|---|---|
|  | Solvent | Amount (ratio) | Solvent | Amount (ratio) | |
| Comparative Example 2 | Tetrahydrofuran | 10 | Dichloromethane | 5 | 450 |
| Comparative Example 3 | Methyl t-butyl ether | 10 | Dichloromethane | 5 | 1730 |
| Comparative Example 4 | Diethyl ether | 10 | Dichloromethane | 5 | 1850 |
| Comparative Example 5 | 1,4-Dioxane | 5 | 1,4-Dioxane | 5 | 1080 |
| Comparative Example 6 | 1,4-Dioxane | 10 | 1,4-Dioxane | 10 | 1415 |
| Comparative Example 7 | 1,4-Dioxane | 15 | 1,4-Dioxane | 15 | — |

Experimental Example

1) Homopolymerization of Propylene

After vacuum-drying a 2 L stainless reactor at 65° C. and cooling the same, 3.0 mmol of triethylaluminum and about 770 g of propylene were sequentially added thereto at room temperature and with addition of 2 bar of hydrogen.

After stirring the mixture for about 10 minutes, 0.060 g of each of the supported metallocene catalysts prepared in Examples 1 to 3 and Comparative Examples 1 to 6 was dissolved in 20 mL of TMA-prescribed hexane, and each of the solutions was added to the reactor under nitrogen pressure. Thereafter, the temperature of the reactor was slowly raised to about 70° C., and then the polymerization was carried out for about 1 h. After the reaction was terminated, unreacted propylene was vented out.

2) Methods of Measuring Physical Properties of Polymers (1) Catalytic activity: a ratio of the weight of the produced polymer (kg PP) to the amount of the used catalyst (mmol and g of catalyst) was calculated, based on unit time (h).

(2) Melting point (Tm) of polymer: a melting point of the polymer was measured by using a differential scanning calorimeter (DSC, Device Name: DSC 2920, Manufacturer: TA instruments). Specifically, after the polymer was heated to 220° C. and the temperature was maintained for 5 min, the temperature was decreased to 20° C. Thereafter, the temperature was increased again. At this time, the scanning speed of heating and cooling processes was respectively 10° C./min.

(3) Crystallization temperature (Tc) of polymer: a crystallization temperature was determined from a DSC curve which was obtained while decreasing the temperature under the same conditions as in the measurement of the melting point by using DSC.

(4) Melt index (MFR, 2.16 kg): a melt index was measured according to ASTM D1238 at 230° C. with a load of 2.16 kg, and determined as a weight (g) of the polymer melted out for 10 min.

3) Results of Measuring Physical Properties of Polymers

The homopolymerization process conditions of Preparation Examples 1 to 3 and Comparative Preparation Examples 1 to 6 using the metallocene-supported catalysts prepared in Examples 1 to 3 and Comparative Examples 1 to 6, and results of measuring physical properties of the produced polypropylenes, are shown in Table 2 (homopolymerization) below.

TABLE 2

|  | Polymerization method | Temperature (° C.) | Amount of supported catalyst (mg) | Yield (G) | polymerization activity (kg-PP/g-cat · h) | Average particle size (μm) | MFR (g/10 min) | Tm (° C.) |
|---|---|---|---|---|---|---|---|---|
| Preparation Example 1 | Homo-polymerization | 70 | 30 | 471 | 15.7 | 781 | 12.1 | 151 |
| Preparation Example 2 | Homo-polymerization | 70 | 30 | 459 | 15.3 | 803 | 11.1 | 150 |
| Preparation Example 3 | Homo-polymerization | 70 | 30 | 477 | 15.9 | 810 | 13.3 | 151 |
| Comparative Preparation Example 1 | Homo-polymerization | 70 | 30 | 27 | 0.9 | 170 | 87.2 | 150 |
| Comparative Preparation Example 2 | Homo-polymerization | 70 | 30 | 303 | 10.1 | 720 | 19.2 | 151 |
| Comparative Preparation Example 3 | Homo-polymerization | 70 | 30 | 75 | 2.5 | 255 | 65.2 | 151 |

TABLE 2-continued

|  | Polymerization method | Temperature (° C.) | Amount of supported catalyst (mg) | Yield (G) | polymerization activity (kg-PP/g-cat · h) | Average particle size (μm) | MFR (g/10 min) | Tm (° C.) |
|---|---|---|---|---|---|---|---|---|
| Comparative Preparation Example 4 | Homo-polymerization | 70 | 30 | 66 | 2.2 | 275 | 59.9 | 150 |
| Comparative Preparation Example 5 | Homo-polymerization | 70 | 30 | 82 | 2.7 | 269 | 60.1 | 150 |
| Comparative Preparation Example 6 | Homo-polymerization | 70 | 30 | 77 | 2.6 | 275 | 69.2 | 151 |

Further, scanning electron microscopic (SEM) images showing a size and a distribution of particles produced after performing polymerization processes according to Example 1 and Comparative Example 1 of the present invention are shown in the FIGURE. As shown in the FIGURE, the particle size of the produced polymer was increased to about 25% to inhibit fine powder generation, thereby securing process stability.

As shown in Table 2, Preparation Examples 1 to 3, in which the metallocene compound according to the present invention was used as a supported catalyst, showed the effect of increasing activity upon preparation of polypropylene. In particular, Preparation Examples 1 to 3 showed excellent catalytic activity of 15.3 kg/g·h to 15.9 kg/g·h upon homopolymerization. In contrast, Comparative Preparation Examples 1 to 4, in which the solvent for extracting the LiCl complex compound was not used according to the known method, or the common ether-based solvent was used, showed remarkably low catalytic activity of 0.9 kg/g·h to 2.5 kg/g·h upon random polymerization. Particularly, Preparation Examples 1 to 3 of the present invention remarkably improved purity of the produced metallocene catalysts, as compared with the known method, and therefore the catalytic activities upon polymerization were about 17 times higher than that of Comparative Preparation Example 1 of the known method. As in Comparative Preparation Example 1, when the catalytic activity is low, a larger amount of the catalyst is needed in order to control slurry density in the polymerization process. When the catalytic activity is low, the catalyst reaches its limit, and there is a difficulty in commercial production. In contrast, when the catalytic activity is high as in Preparation Examples 1 to 3 of the present invention, a small amount of the catalyst is needed to control slurry density, and thus it is advantageous in commercial production.

Furthermore, in Preparation Examples 1 to 3 using the high-purity metallocene catalyst according to the present invention, an average particle size of the produced polypropylene was about 3 times larger than those of Comparative Preparation Examples 1 to 6, and in particular, about 4.5 times larger than that of Comparative Preparation Example 1. Accordingly, there is an advantage that long-term production may be stably performed without fouling in a commercial continuous process. As in Comparative Preparation Examples 1, 3, and 4, when the average particle size of the produced polyolefin is significantly small, a possibility of fine powder generation increases or sheets are produced during the process to cause fouling, leading to reduction of overall process efficiency.

Further, in the examples of the present invention, it was confirmed that MFR values were remarkably low, indicating that polypropylene prepared by using the metallocene compound according to the present invention as the supported catalyst has a very high molecular weight.

The invention claimed is:

1. A method of preparing a metallocene catalyst, the method comprising the steps of:
   A) forming a metallocene compound by reacting a ligand compound represented by the following Chemical Formula 1 with a zirconium compound comprising chloride in the presence of an alkyl lithium;
   B) adding a first solvent to the reaction products from step A) including the metallocene compound to form a lithium chloride—the first solvent complex; and
   C) adding a second solvent to the reaction products from step B) to precipitate the lithium chloride—the first solvent complex, followed by filtration:

[Chemical Formula 1]

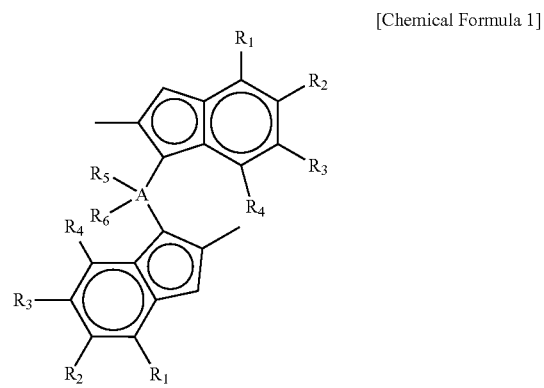

wherein $R_1$ is a $C_{6-20}$ aryl substituted with a $C_{1-20}$ alkyl;
$R_2$, $R_3$, and $R_4$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl;
A is carbon, silicon, or germanium;
$R_5$ is a $C_{1-20}$ alkyl substituted with a $C_{1-20}$ alkoxy; and
$R_6$ is hydrogen, a $C_{1-20}$ alkyl, or a $C_{2-20}$ alkenyl,
wherein the first solvent is one or more selected from the group consisting of 1,4-dioxane and 1,3-dioxolane, and
wherein the second solvent is one or more selected from the group consisting of dichloromethane, chloroform, carbon tetrachloride, benzene, and toluene.

2. The method according to claim 1, wherein the zirconium compound is bis(N,N'-diphenyl-1,3-propanediamido)dichlorozirconium bis(tetrahydrofuran).

3. The method according to claim 1, wherein $R_1$ is a phenyl substituted with a t-butyl.

4. The method according to claim 1, wherein $R_1$ is 4-(t-butyl)-phenyl.

5. The method according to claim 1, wherein $R_2$, $R_3$, and $R_4$ are hydrogen.

6. The method according to claim 1, wherein A is silicon.

7. The method according to claim 1, wherein $R_5$ is 3-(t-butoxy)-propyl, and $R_6$ is methyl.

8. The method according to claim 1, wherein the first solvent is added and stirred for 1 h or more.

9. The method according to claim 1, wherein the first solvent is removed before step C) by vacuum distillation under conditions of a pressure of 0.5 mbar to 2.0 mbar and a temperature of 30° C. to 45° C.

10. The method according to claim 1, wherein the second solvent is added and filtration is performed, and then the second solvent is removed from the obtained filtrate, followed by recrystallization using one or more solvents selected from the group consisting of dichloromethane and hexane.

* * * * *